(12) United States Patent
Cao et al.

(10) Patent No.: US 12,050,813 B2
(45) Date of Patent: Jul. 30, 2024

(54) SHARED MEMORY MECHANISM TO SUPPORT FAST TRANSPORT OF SQ/CQ PAIR COMMUNICATION BETWEEN SSD DEVICE DRIVER IN VIRTUALIZATION ENVIRONMENT AND PHYSICAL SSD

(71) Applicant: Intel Corporation, Santa Clara, CA (US)

(72) Inventors: Gang Cao, Shanghai (CN); Ziye Yang, Shanghai (CN); Xiaodong Liu, Shanghai (CN); Changpeng Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/874,237

(22) Filed: Jul. 26, 2022

(65) Prior Publication Data
US 2022/0365729 A1 Nov. 17, 2022

Related U.S. Application Data

(63) Continuation of application No. 17/253,578, filed as application No. PCT/CN2019/074111 on Jan. 31, 2019, now Pat. No. 11,435,958.

(51) Int. Cl.
*G06F 3/06* (2006.01)
*G06F 9/455* (2018.01)

(52) U.S. Cl.
CPC .......... *G06F 3/0664* (2013.01); *G06F 3/0611* (2013.01); *G06F 3/0659* (2013.01); *G06F 3/0679* (2013.01); *G06F 9/45558* (2013.01); *G06F 2009/45579* (2013.01)

(58) Field of Classification Search
CPC ......... G06F 2009/45579; G06F 3/0659; G06F 3/0679; G06F 3/061; G06F 3/0611; G06F 3/0664; G06F 9/45545; G06F 9/4555; G06F 9/45558; G06F 9/4812
See application file for complete search history.

(56) References Cited

U.S. PATENT DOCUMENTS

| | | | |
|---|---|---|---|
| 8,627,315 B2 | 1/2014 | Li et al. | |
| 9,336,036 B2 | 5/2016 | Dong et al. | |
| 2011/0161955 A1* | 6/2011 | Woller | G06F 9/45545 718/1 |
| 2015/0319243 A1* | 11/2015 | Hussain | G06F 3/0689 709/217 |
| 2016/0217104 A1* | 7/2016 | Kamble | G06F 3/067 |
| 2018/0063088 A1* | 3/2018 | Hardy | H04L 63/0272 |

(Continued)

OTHER PUBLICATIONS

International Search Report and Written Opinion for PCT Patent Application No. PCT/CN19/74111, Mailed Nov. 6, 2019, 9 pages.
(Continued)

*Primary Examiner* — Jane W Benner
(74) *Attorney, Agent, or Firm* — Compass IP Law PC (57) ABSTRACT

An apparatus is described. The apparatus includes an accelerator to be coupled to a memory region that the accelerator shares with a virtualization environment comprising a guest OS, a guest VM and an SSD device driver. The accelerator is to forward a submission queue doorbell setting made by the SSD device driver in the shared memory to a corresponding submission queue doorbell in an SSD controller.

19 Claims, 5 Drawing Sheets

(56) References Cited

U.S. PATENT DOCUMENTS

2019/0026136 A1    1/2019   Nair
2020/0104056 A1*   4/2020   Benisty ................. G06F 3/0688
2020/0183611 A1*   6/2020   Gondi ................... G06F 3/0676

OTHER PUBLICATIONS

Notice of Allowance for U.S. Appl. No. 17/253,578, Mailed Apr. 26, 2022, 10 pages.

Qiu, Sheng, et al., "Alibaba: Using SPDK in Production", Alibaba Infrastructure Service, May 15, 2018, 12 pages, © 2018 Alibaba Group.

Starting on p. 1, paragraphs [0003] through paragraph [0020] only of the published patent application US 2021/0271426 A1, filed Dec. 17, 2020, pp. 1-2.

Yang, et al., "SPDK vhost-NVMe: Accelerating I/Os in Virtual Machines on NVMe SSDs via User Space Vhost Target", 2018 IEEE 8th International Symposium on Cloud and Service Computing (SC2), 10 pages.

Yang, Ziye, et al., "Accelerating NVMe I/Os in Virtual Machine via SPDK vhost* Solution", Open Source Summit, The Linux Foundation, 28 pages, © 2018 Intel Corporation.

* cited by examiner

SHARED MEMORY MECHANISM TO SUPPORT FAST TRANSPORT OF SQ/CQ PAIR COMMUNICATION BETWEEN SSD DEVICE DRIVER IN VIRTUALIZATION ENVIRONMENT AND PHYSICAL SSD

CLAIM OF PRIORITY

This application is a continuation of U.S. patent application Ser. No. 17/253,578, filed Dec. 17, 2020, which is a U.S. National Phase application under 35 U.S.C. § 371 of International Application No. PCT/CN19/74111, filed Jan. 31, 2019, each of which are incorporated by reference in their entirety.

FIELD ON INVENTION

The field of invention pertains generally to the computing sciences, and, more specifically, to a shared memory mechanism to support fast transport of SQ/CQ pair communication between SSD device driver In virtualization environment and physical SSD.

BACKGROUND

High performance computing environments, such as raised floor data centers, commonly demand high performance non volatile mass storage devices. Solid State Drives (SSDs), which are composed of flash memory devices, have recently emerged to provide faster latencies than hard disk drives. SSDs have traditionally been coupled to computing hardware platforms by way of Peripheral Component Interface Extended (PCIe) links.

Non Volatile Memory Express (NVMe) has recently emerged to improve the throughput capacity of PCIe connected SSDs. Specifically, NVMe expands the number of I/O queues that can feed commands to an SSD and expands the size of each such queue (current NVMe specifications describe an SSD that supports 64K I/O queues with each queue capable of queuing up to 64K commands). Unfortunately, particularly in virtualized environments, the full benefit of the NVMe throughput improvements are not realized in corresponding improved SSD performance.

Figure 1A:
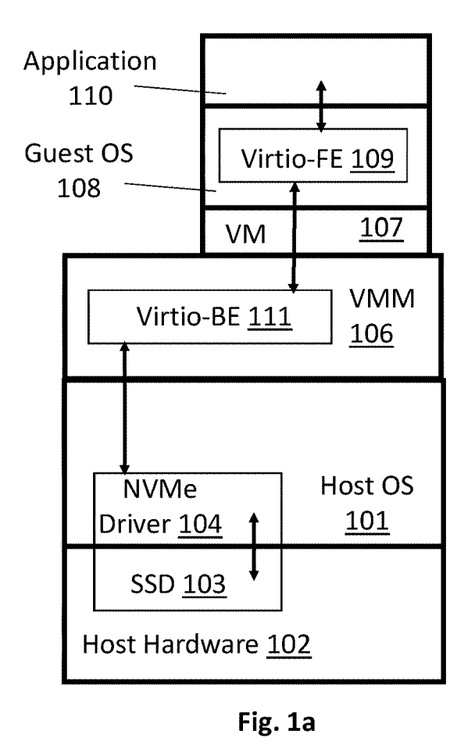
FIGS. 1a, 1b and 1c show different virtio NVMe SSD implementations.
Figure 1B:
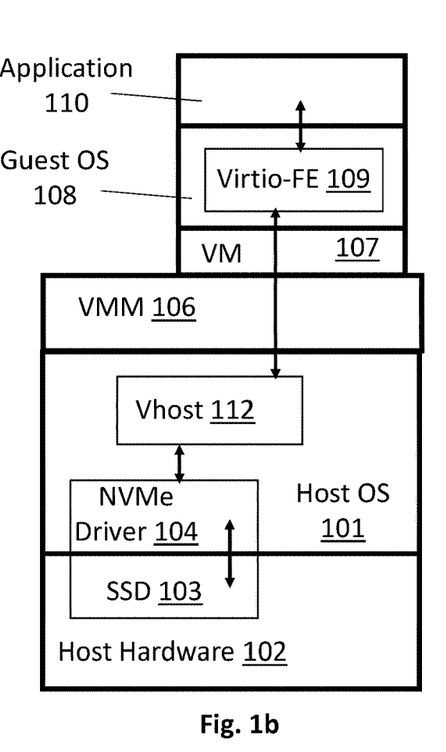
Figure 1C:
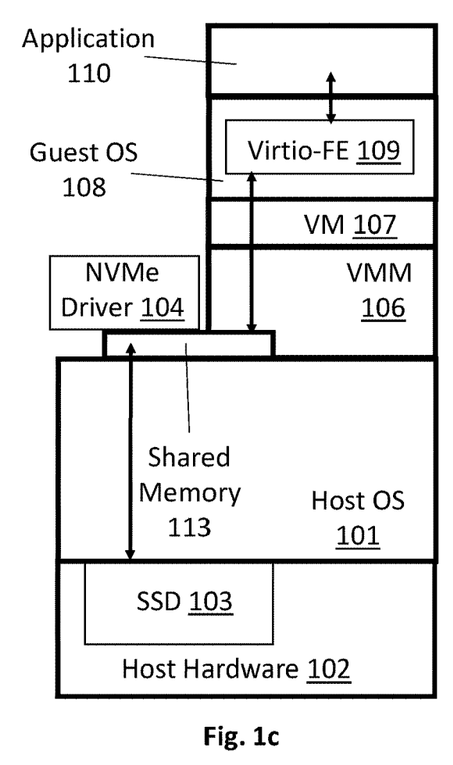

FIGS. 1a, 1b and 1c show three common NVMe implementations in a "para-virtualized" environment. As will be immediately explained, a complex myriad of inter-software communications must transpire in order for an application 110 or guest OS 108 to read/write from/to a SSD 103. The sheer complexity of each arrangement results in overall reduced SSD 103 performance than what should be realized from NVMe SSDs.

FIG. 1a depicts a first approach referred to as nominal/standard virtio handling. Here, a typical virtualized environment is shown in which a host computer hardware platform 102 (e.g., a high performance server) includes an attached or integrated SSD 103. A host operating system (host OS) 101 (e.g., Linux) executes on the host computer 102, and, an NVMe compliant device driver 101 for communicating with the SSD 103 is integrated into the host OS 101.

A virtual machine monitor 106 (VMM) (e.g., Quick Emulator (QEMU), VMMs offered by VMWare Corp., etc.), also referred to as a "hyper-visor", executes on the host OS 101. As is known in the art, a VMM 106 is an application software program that supports the execution of multiple virtual machines (VMs). For ease of drawing FIG. 1a shows only one VM 107. As observed in FIG. 1a, a VM 107 is able to support an entire guest operating system (guest OS) 108 (e.g., Linux, Windows, FreeBSD, etc.) and any applications that run on the guest OS (for ease of drawing, FIG. 1a shows only one such application 110).

The VM 107 presents the image of a complete computing platform to the guest OS 108 so that guest OS 108 "thinks" it is running on its own dedicated hardware, when, in fact, the VMM 107 is distributing the actual resources of the host hardware computer 102 to the multiple VMs that are executing on the VMM 107. In this manner, multiple isolated computing environments (one such environment per VM) can be instantiated on a single host hardware computer 102.

The specific para-virtualization approach of FIG. 1a uses a virtio arrangement 109, 111 to handle read/write commands between a guest application 110 and/or guest OS 108 and the SSD device driver 104. As observed in FIG. 1a, the virtio arrangement includes a virtio front end (FE) driver 109 that is integrated in the guest OS 108 and a virtio back end (BE) driver 111 that is integrated in the VMM 106. The FE and BE virtio drivers manage SSD command queues and data flows between the guest application 110 and/or guest OS 108 and the VMM 107 over a shared memory (main memory of the host computer 102 is allocated for both drivers 109, 111 to write/read to/from) which quickens the communication between the guest and VMM layers. The back end virtio 111 communicates commands to the SSD device driver 104. The back end virtio 111, however, suffers from inefficient execution (e.g., it is not allocated with sufficient CPU and/or memory resources by the VMM 107) resulting in a solution that struggles to provide the SSD driver 104 and/or hardware 103 with offered loads that approach SSD capacity and/or result in disappointing latency from the perspective of the guest layers 110/108.

FIG. 1b shows an improved approach (referred to as "vhost kernel") that replaces the virtio-BE with a thread or process 112 in the host OS 101 (the vhost kernel). Because SSD commands are now handled by a dedicated host OS thread/process, the vhost approach exhibits improved performance over the standard virtio approach of FIG. 1a. Nevertheless, the vhost kernel approach, like the virtio approach of FIG. 1a, includes three separate software entities for SSD command handling (the virtio-FE 109, the vhost kernel 112 and the SSD device driver 104) which corresponds to significant execution overhead and corresponding inability to feed the SSD 103 at maximum throughput and/or resulting disappointing latency from the perspective of the guest layers 110/108.

FIG. 1c shows a further improved approach (referred to as "vhost user") that essentially enables direct communication between the virtio-FE 109 and the device driver 104 through a shared memory 113 transport mechanism (that, e.g., is configured with a large amount of shared memory space). The vhost user approach of FIG. 1c eliminates an entire layer of SSD handling software as compared to the approaches of FIGS. 1b and 1c and therefore exhibits better throughput and latency as compared to these approaches. Nevertheless, owing at least to the overhead of the protocol conversions between the virtio-FE 109 and SSD driver 104, the vhost user approach still struggles to feed the SSD at near throughput capacity and exhibits notable latency to complete commands.

Any of the approaches described above may use hardware assisted virtualization such as Kernel-based Virtual Machine (KVM). In the case of hardware assisted virtualization, the CPU cores of the host computer 102 include special instructions for speeding-up virtualized processes. For example, in the case of a Virtio-BE 111 or the vhost 112 system, the virtio-FE 109 may execute a VM_Exit followed by execution of a KVM instruction which triggers a wake-up or otherwise facilitates communication to the lower handling entities 111/112.

Notably, none of these approaches attempt a true virtualization environment in which the SSD device driver 104 is integrated in the guest OS 108. Here, a true virtualization experience in which the guest environment 108/110 executes its own instance of the SSD device driver 104 is preferable at least because the guest environment would have full visibility/functionality of the SSD's own interface.

A problem with integrating the SSD device driver 104 into the guest OS 108 is the tight coupling that has traditionally existed between the SSD device driver 104 and the host hardware 102 making virtualization difficult.

Figure 2A:
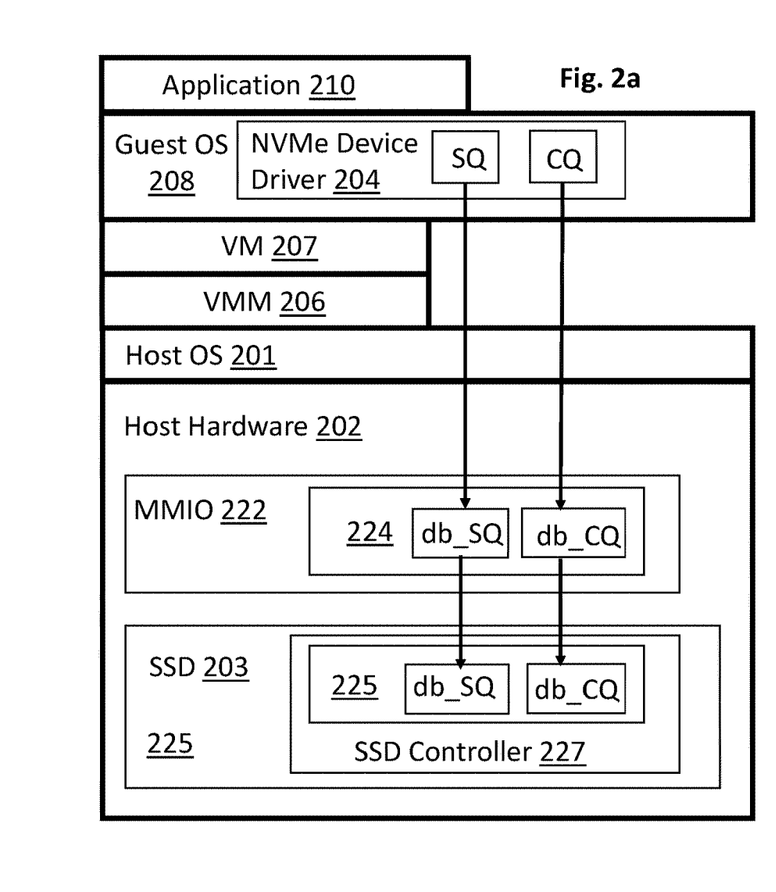
FIGS. 2a and 2b show different attempts at running an NVMe device driver in a virtualized environment.

FIG. 2a depicts an attempt at virtualization for legacy NVMe versions that required the writing of specific SSD register space in the SSD controller hardware 227 in order to command the SSD to perform read/write operations. Here, doorbell registers 224 (db_SQ, db_CQ) for both a submission queue (SQ) and a completion queue (CQ) reside in memory mapped I/O (MMIO) space 222 of the host computer 202.

As is known in the art, MMIO space 224 is technically not main memory space but rather a reserved section of physical main memory (or actual CPU register space) that is meant to mimic register space of a peripheral device such as the register space 225 of the SSD's controller 227. When software writes to MMIO space 224, the content of the MMIO space is automatically written by the hardware into the corresponding registers in the peripheral's register space 225.

In the case of legacy NVMe SSDs, the device driver 204 maintains both a submission queue (SQ) and the completion queue (CQ). The SQ tracks commands that the device driver 204 has issued to the SSD 203 and the CQ tracks which of these commands the SSD is executing. When the device driver sends 204 a command to the SSD it enters the command in the tail of the SQ and sets the db_SQ doorbell in MMIO space 222. The hardware 202 automatically writes the updated db_SQ content into the same, corresponding db_SQ register of the SSD's register space 225.

The SSD controller 227 then fetches the command from the SQ which physically exists in main memory of the computer 202 (in the case of a write command, the SSD controller 227 also fetches the write data from a main memory location specified by the command). When the SSD controller 227 completes the command, the SSD controller 227 writes a corresponding entry at the head of the CQ (in the case of a read, the controller 227 also writes the read response in a main memory location specified by the read command) and generates an interrupt. The device driver 204 processes the entry that was entered at the head of the CQ and sets information in the db_CQ doorbell in MMIO space 222. The hardware 202 then automatically sets the same corresponding information in the db_CQ doorbell register of the SSD controller 227.

Unfortunately, because accessing MMIO space 222 is essentially a low level hardware operation, the VM 207 and/or VMM 206 is not capable of providing the device driver 204 with access to it. As such, a VM_Exit has to be executed by the device driver 204 to execute instruction(s) that access MMIO space 222. As the VM_Exit corresponds to a significant inefficiency (it essentially suspends the VM 207), and as each command requires two MMIO accesses, the execution of the device driver 204 virtually on the VM 207 is too inefficient and not a feasible solution.

Figure 2B:
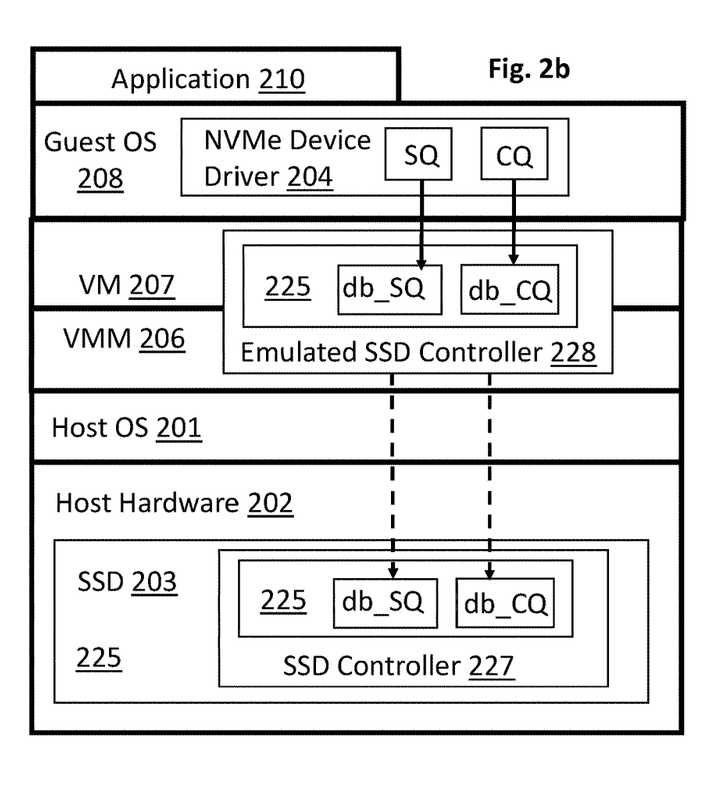

In order to address this problem, NVMe version 1.3, depicted in FIG. 2b, has introduced an emulated SSD controller 228. The emulated SSD controller 228 operates, e.g., as software from main memory and mimics the behavior of the SSD's actual physical controller 227. Because communicating with the emulated SSD controller 228 from the perspective of the VM 207 and VMM 206 does not require a low level MMIO access, the SSD device driver 204 is able to write to the emulated controller 228 directly in a virtualization environment (the VM 207 is executing) without a VM exit.

FIGURES

A better understanding of the present invention can be obtained from the following detailed description in conjunction with the following drawings, in which.

DETAILED DESCRIPTION

Some inefficiency remains, however, with the NVMe 1.3 solution of FIG. 2b. In particular, there is communication between the device driver 204 and emulated SSD controller 228 in virtualized space as two separately running instances of program code. As such, a nominal process-to-process or thread-to-thread communication and/or protocol conversion needs to transpire between the SSD driver 204 and emulator 228 in order to for the device driver 204 to write to the doorbell registers of the emulator.

Secondly, with the emulator 228, being instantiated as a component of the VM/VMM 207/206 virtualization environment, its performance level is constrained by whatever CPU and memory resources are allocated to it by the VMM 206. Here, with the VMM 206 having to allocate hardware resources to many different software entities (e.g., thousands of VMs, thousands of guest OSs, etc.), the emulator 228 is apt to be left short of all the hardware resources it needs to quickly feed the SSD 227 to its full capacity. Said another way, the NVMe 1.3 solution of FIG. 2b inherits some of the inefficiencies of the virtio solutions discussed above with respect to FIGS. 1a-c.

Figure 3:
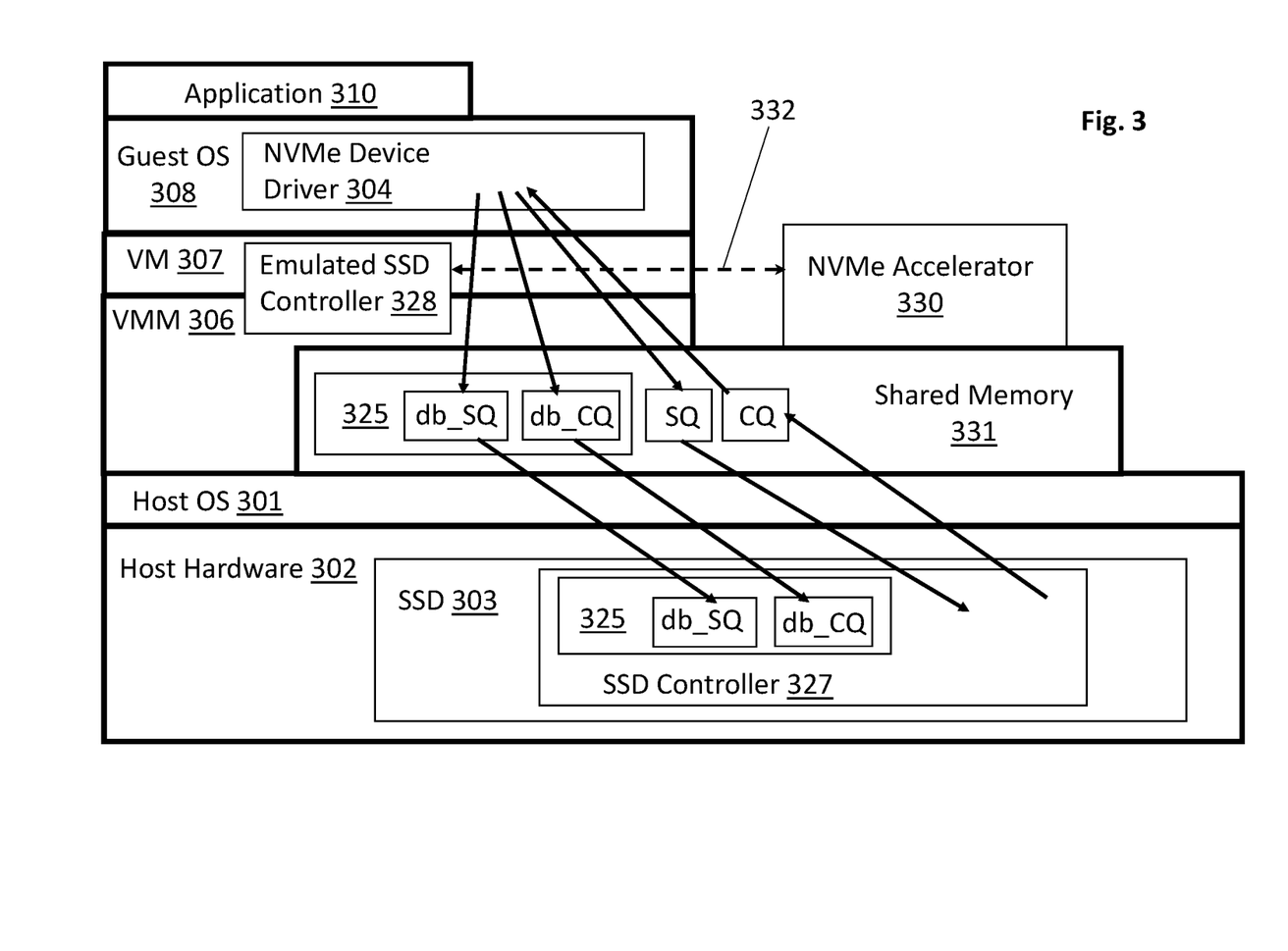
FIG. 3 shows an improved architecture for running an NVMe device driver in a virtualized environment.

FIG. 3 shows an architecture that improves the throughput and reduces the latency of the basic NVMe 1.3 solution discussed above with respect to FIG. 2b. As observed in FIG. 3, the improved architecture includes an NVMe accelerator 330 that is coupled to a same shared memory 331 region that is also allocated to the VMM 307 and VM 308. In an embodiment, the shared memory region 331 is explicitly reserved in the VMM 307 and the VM 308 for NVMe related data and/or traffic so that resource competition with other VMM/VM functions is reduced or eliminated. Thus, ideally, there is dedicated "pipe" between the driver 304 and accelerator 330.

That is, the VMM/VM/driver 307/308/304 and the accelerator 330 are both able to read/write directly from/to the shared memory region 331. With both the virtualization environment 307/308/304 and the accelerator 330 having read/write access to the same shared memory region 331, the inefficient and semantic heavy inter-process or inter-thread communication or protocol conversion that normally transpires between two software entities that do not share the same memory space is avoided. As such both throughput and latency concerning driver 304/controller 327 communications is enhanced.

Moreover, as observed in FIG. 3, the accelerator 330 is not a component of the VMM 307 (it is not a part of the virtualization environment 307/308/304). The accelerator 330 has the primary responsibility of forwarding to the SSD 303 communications (such as doorbell communications) and/or data written into the shared memory region 331 by the driver 304 (and/or application 310 that the device driver supports).

Here, as observed, the emulated doorbell registers 325, the SQ and the CQ are all physically located in the shared memory region 331 so that the device driver 304 can directly access each of these structures (specifically, the device driver can 304 can directly write to both emulated doorbells 325 and the SQ, and, directly read from the CQ). In various embodiments, write data is also written by the device driver 304 to the shared memory 331 prior to being written to the SSD 303, and, read data from the SSD is written into the shared memory 331 for immediate access by the device driver 304 (and/or application 310).

In various embodiments the accelerator 330 includes an NVMe driver, or similar functioning program code, to communicate with the SSD controller 327. Here, communication between the accelerator 330 and the SSD controller 327 may be performed according to standard non-virtualized NVMe processes. Here, for instance, if the accelerator 330 writes to the register space of the SSD controller 327 by way of MMIO transactions, no VM_Exit needs to be executed by the accelerator 330 because it does not execute from a virtualized environment.

Figure 4:
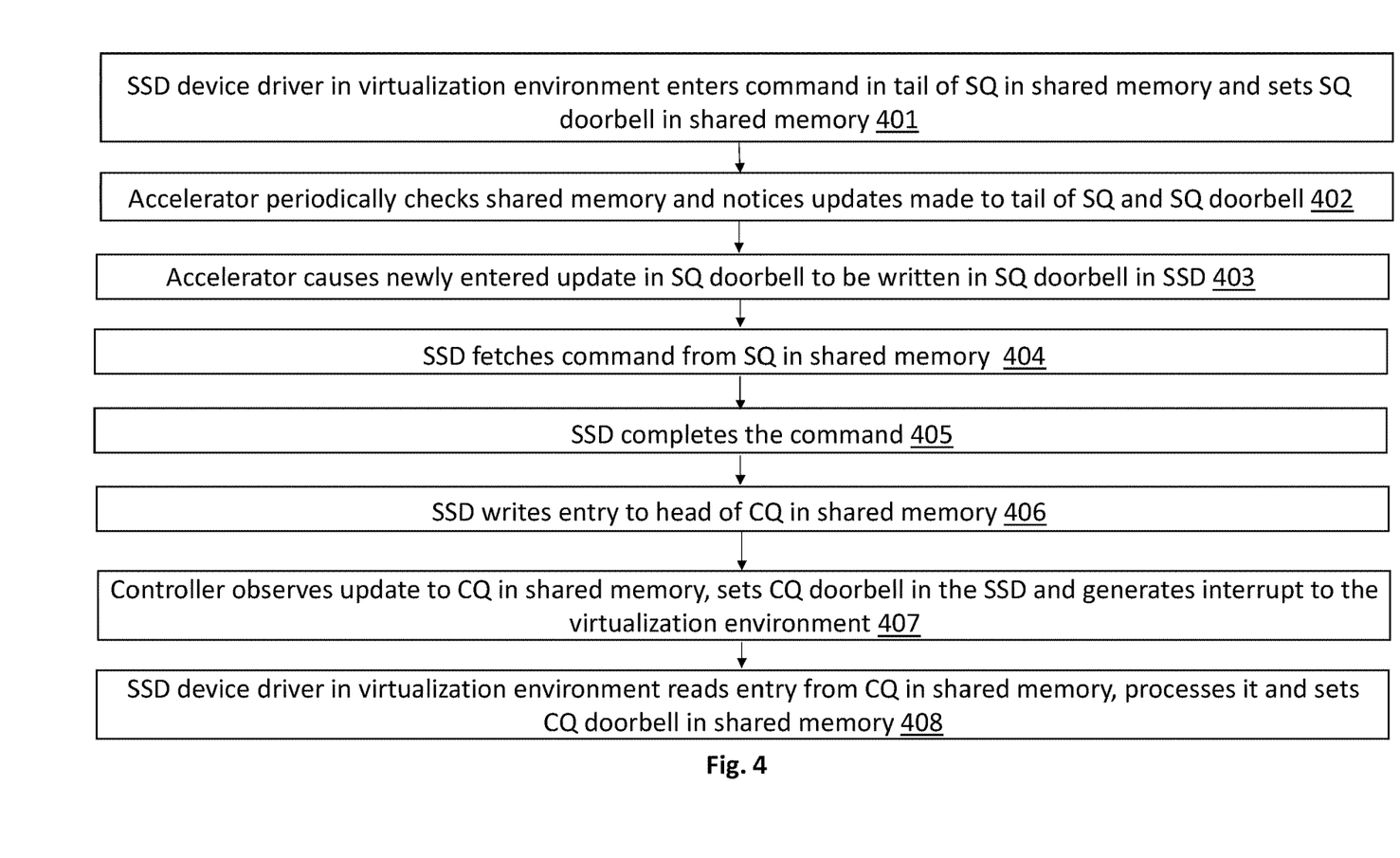
FIG. 4 shows a method performed by the architecture of FIG. 3.

FIG. 4 shows an embodiment of an end-to-end command process within the framework of the system of FIG. 3. When the device driver 304 in the virtualization environment sends 401 a command to the SSD it enters the command in the tail of the SQ in shared memory 331 and sets the db_SQ doorbell in shared memory 331. The accelerator 330 periodically checks the state of the db_SQ in shared memory and notices 402 the new entries made by the driver 304. The accelerator 330 then writes 403 the updated db_SQ content in shared memory 331 into the same, corresponding db_SQ register of the SSD's register space 325.

The SSD controller 327 then fetches 404 the command(s) from the SQ in shared memory 331 (in the case of a write command, the SSD controller 327 also fetches the write data from a location in shared memory 331 specified by the command). When the SSD controller 327 completes the command(s) 405, the SSD controller 327 writes 406 corresponding entry/entries at the head of the CQ in shared memory 331 (in the case of a read, the controller 327 also writes the read response in a location of shared memory 331 specified by the read command) and generates an interrupt. In response to the interrupt, the accelerator 330 observes 407 the updated information in the CQ in shared memory 331, sets the db_CQ in the SSD controller 327 and causes an interrupt to be generated to the guest OS 308 and NVMe device driver 304. In response to the interrupt, the NVMe device driver 304 reads 408 the updated information from the CQ in shared memory 331, processes it and sets the db_CQ in shared memory 331.

Thus, from the above description, the accelerator 331 behaves like an NVMe device driver from the perspective of the SSD controller 327, and, behaves like an SSD controller from the perspective of the guest OS 304 and virtualized NVMe device driver 304.

In an embodiment, the NVMe device driver 304 is configured to append commands that are entered in the SQ in shared memory 331 with values that increment with each next command (e.g., after initializing at 0, a first command is appended with the value of 1, a second command is appended with the value of 2, a third command is appended with the value of 3, etc.). The accelerator periodically checks the state of the SQ in shared memory and records the largest/highest value of any command entered in the SQ in shared memory (the value of the last command to be entered in the SQ).

Upon a next check into the state of the SQ the accelerator 330 again identifies the highest value assigned to a command in the queue and compares it with its recorded value from the prior check. If the new highest value is different from the highest value from the prior check, the accelerator can immediately identify how many new commands have been entered in the SQ as the difference between the two values. With knowledge of how many new commands have been entered into the SQ in shared memory 331, the accelerator can inform the SSD controller 327 of the same.

In order to reduce contention/thrashing between the virtualization stack (guest OS 308/device driver 304) and the accelerator 330 for shared memory 331, the virtualization stack is given access to the shared memory in large enough chunks of time and/or data to fully write the SQ and set the db_SQ in shared memory. According to current NVMe specifications, an update to the SQ can be as large as 64 bytes plus additional bytes for the setting of the db_SQ. Thus, when the virtualization stack is given access to the shared memory 331 it maintains uninterrupted access, per new command, until more than 64 bytes of information have been written into the shared memory (the virtualization stack does not relinquish access to shared memory until both the SQ and db_SQ have been updated, per command).

Similarly, for the completion end of the process, 16 bytes of information are written into the head of the CQ per command completion. As such, at least 16 bytes worth of access to shared memory 331 are given as a single block, e.g., to the controller 327, per completion entry at the head of the CQ, to allow for an uninterrupted writing of new entries into the CQ. Note that such writes can be performed entirely in hardware as direct memory accesses (DMAs) from the controller 327 to shared memory 331, or, the transport of the completion entry (and any read response data) from the SSD 303 to the shared memory 331 through the hardware can be controlled in software by the accelerator 330.

In the case of the former (DMA) the uninterrupted access to shared memory is effectively given to the controller. In the case of the later (software controlled), the uninterrupted access is given to the accelerator 330. Note that transfers from the SQ in shared memory to the SSD 303 can also be performed by DMA (in which case the SSD controller 327 effectively has control of the transfer) or in software (in which case the accelerator 330 has control).

In either the db_SQ transfer from shared memory to the db_SQ register in the SSD controller 327 or the SQ transfer from shared memory 331 to the SSD 303 no extra copy of the information need be made, e.g., in some other intermediate memory space. That is, a read of the information from shared memory 331 is directly written into the SSD 303.

Although the discussion of FIGS. 3 and 4 have centered on the handling of a single SQ/SC pair, note that current NVMe SSD's are capable of supporting 64 k such pairs. As such, in various embodiments, there can be as many as 64 k different instances of shared memory per SSD 303. That is, 64 k different virtualization stacks (64 k unique sets of guest OS/guest VM/driver) can be supported by a single SSD. In an embodiment, each such virtualization stack is provided its own unique shared memory space. Depending on implementation, a single accelerator 331 may interface with all 64 k regions of shared memory as separate, isolated partitions of the total amount of shared memory space it is allocated, and, channel SQ/SC pair traffic to/from a single SSD.

Referring back to the architecture of FIG. 3, note that administrative commands sent from the device driver 304 to the SSD 303, as opposed to raw data commands and/or data, may be passed through a lower performance connection 332 than the shared memory 331 region. For example, a nominal thread-to-thread communication, UNIX socket, etc. may be used. Here, the precise flow includes the device driver 304 sending an administrative command to the emulated SSD controller 328. The emulated SSD controller 328 then sends the command to the accelerator 331 by way of a nominal non shared memory communication.

Figure 5:
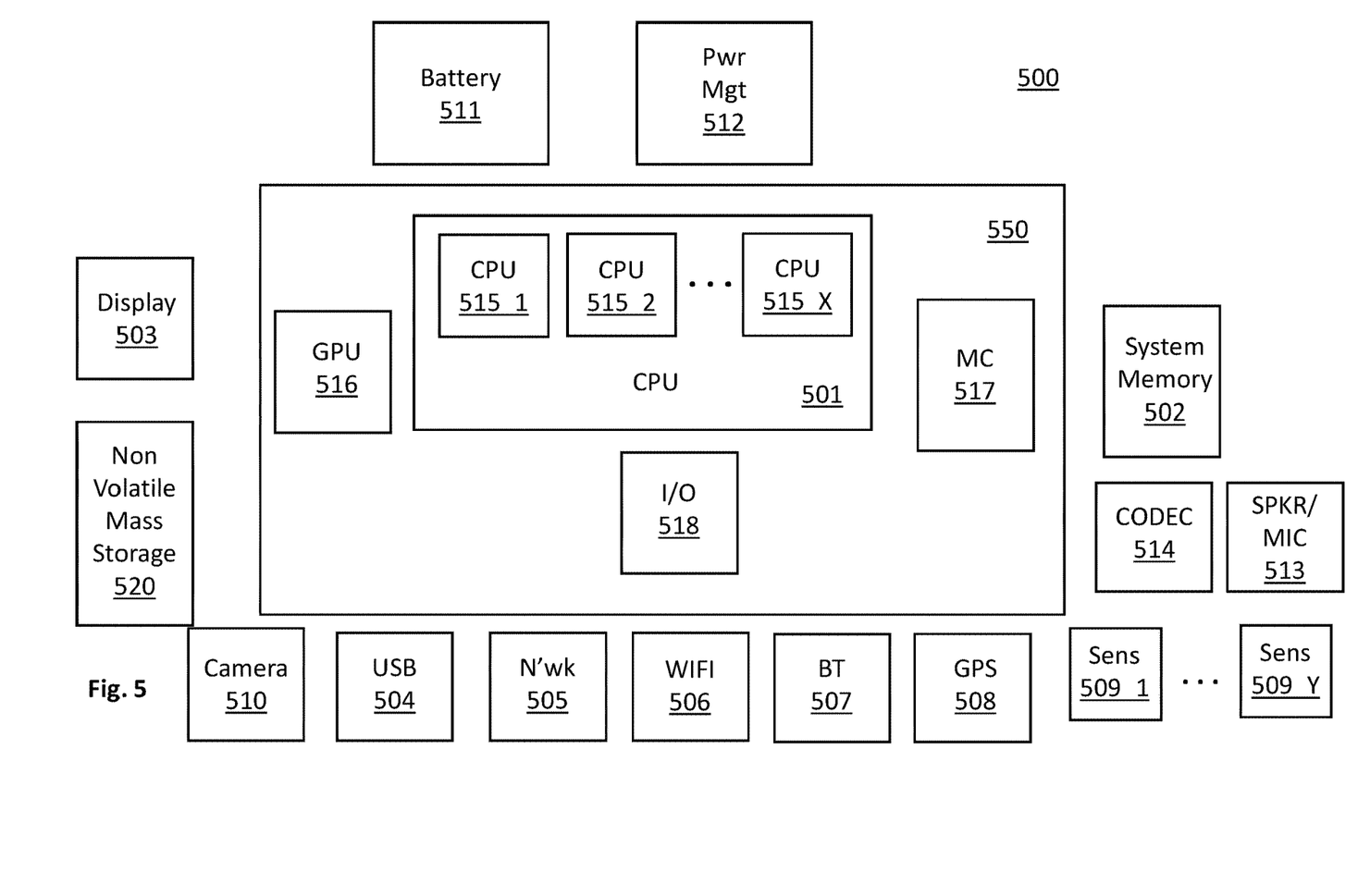
FIG. 5 shows a computing system.

FIG. 5 provides an exemplary depiction of a computing system 500 (e.g., a smartphone, a tablet computer, a laptop computer, a desktop computer, a server computer, etc.). As observed in FIG. 5, the basic computing system 500 may include a central processing unit 501 (which may include, e.g., a plurality of general purpose processing cores 515_1 through 515_X) and a main memory controller 517 disposed on a multi-core processor or applications processor, system memory 502, a display 503 (e.g., touchscreen, flat-panel), a local wired point-to-point link (e.g., USB) interface 504, various network I/O functions 505 (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_Y, one or more cameras 510, a battery 511, a power management control unit 512, a speaker and microphone 513 and an audio coder/decoder 514.

An applications processor or multi-core processor 550 may include one or more general purpose processing cores 515 within its CPU 501, one or more graphical processing units 516, a memory management function 517 (e.g., a host side memory controller) and an I/O control function 518. The general purpose processing cores 515 typically execute the system and application software of the computing system. The graphics processing unit 516 typically executes graphics intensive functions to, e.g., generate graphics information that is presented on the display 503.

The I/O control function may include a peripheral control hub or other circuit having an interface to a mass non volatile storage 520 (e.g., an interface to a solid state drive (SSD) (e.g., a PCIe link where the SSD is an NVMe SSD, an interface to a disk drive, etc.). The memory control function 517 interfaces with the system memory 502 to write/read data to/from system memory 502. The system memory may be implemented as a multi-level system memory.

In various implementations, the computer 500 is a high performance computer (e.g., a high performance server computer) having software installed thereon to implement an accelerator that transfers communications of SQ/CQ pairs over shared memory between a physical SSD and a virtualization stack that includes an NVMe device driver as described at length above.

Each of the touchscreen display 503, the communication interfaces 504-507, the GPS interface 508, the sensors 509, the camera(s) 510, and the speaker/microphone codec 513, 514 all can be viewed as various forms of I/O (input and/or output) relative to the overall computing system including, where appropriate, an integrated peripheral device as well (e.g., the one or more cameras 510). Depending on implementation, various ones of these I/O components may be integrated on the applications processor/multi-core processor 550 or may be located off the die or outside the package of the applications processor/multi-core processor 550. The power management control unit 512 generally controls the power consumption of the system 500.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A non-transitory machine-readable storage medium containing program code that when processed by a computer causes a method to be performed, the method comprising:
    checking a submission queue in a shared memory region, by an accelerator, for input/output (I/O) commands from a device driver of a guest operating system (OS) on a virtual machine (VM) to access a storage device, wherein the device driver and the accelerator have access to the shared memory region, wherein, the guest OS, the VM and the accelerator are instances of program code that execute above a layer of host OS software;
    causing, by the accelerator, the I/O commands from the submission queue in the shared memory region to be sent to a second submission queue of a controller of the storage device; and,
    causing, by the accelerator, an interrupt to be generated to the guest OS in response to completion of the I/O commands;

wherein the device driver of the guest OS is to access a completion queue in the shared memory region to determine the I/O commands completed.

2. The non-transitory machine-readable storage medium of claim 1, wherein:
the VM has access to the shared memory region.

3. The non-transitory machine-readable storage medium of claim 1, wherein:
the accelerator includes a driver for the storage device.

4. The non-transitory machine-readable storage medium of claim 3, wherein:
the driver for the storage device includes a Non Volatile Memory Express (NVMe) driver.

5. The non-transitory machine-readable storage medium of claim 1, wherein:
the accelerator is external from the guest OS and the VM.

6. The non-transitory machine-readable storage medium of claim 5, wherein:
the accelerator is external from a virtual machine monitor (VMM).

7. The non-transitory machine-readable storage medium of claim 1, wherein:
the storage device includes a solid state drive (SSD).

8. The non-transitory machine-readable storage medium of claim 1, wherein:
the device driver of the guest OS enters the I/O commands in the submission queue and sets a submission queue doorbell in the shared memory region.

9. The non-transitory machine-readable storage medium of claim 8, wherein the method comprises:
causing, by the accelerator, an update to the submission queue doorbell in the shared memory region to be made to a second submission queue doorbell in the storage device.

10. The non-transitory machine-readable storage medium of claim 1, wherein:
a controller of the storage device writes to the completion queue in the shared memory region in response to completion of the I/O commands and sets a completion queue doorbell in the storage device.

11. An apparatus, comprising:
an accelerator to:
periodically check a submission queue in a shared memory region for input/output (I/O) commands from a device driver of a guest operating system (OS) on a virtual machine (VM) to access a storage device, wherein the device driver and the accelerator have access to the shared memory region,
cause the I/O commands from the submission queue in the shared memory region to be fetched by the storage device to a second submission queue of a controller of the storage device; and,
cause an interrupt to be generated to the guest OS in response to completion of the I/O commands; and,
a memory including the shared memory region, wherein, the guest OS, the VM and the accelerator are instances of program code that execute above a layer of host OS software.

12. The apparatus of claim 11, further comprising:
the storage device.

13. The apparatus of claim 12, wherein:
the storage device includes a solid state drive (SSD).

14. The apparatus of claim 11, wherein:
the VM has access to the shared memory region.

15. The apparatus of claim 11, wherein:
the accelerator includes a driver for the storage device.

16. The apparatus of claim 15, wherein:
the driver for the storage device includes a Non Volatile Memory Express (NVMe) driver.

17. A method comprising:
periodically checking a submission queue in a shared memory region, by a software accelerator, for input/output (I/O) commands from a device driver of a guest operating system (OS) on a virtual machine (VM) to access a storage device, wherein the device driver and the software accelerator have access to the shared memory region, wherein, the guest OS, the VM and the software accelerator are instances of program code that execute above a layer of host OS software;
causing the I/O commands from the submission queue in the shared memory region to be sent to a second submission queue of a controller of the storage device; and,
causing, by the software accelerator, an interrupt to be generated to the guest OS in response to completion of the I/O commands;
wherein the device driver of the guest OS is to access a completion queue in the shared memory region to determine the I/O commands completed.

18. The method of claim 17, wherein:
the VM has access to the shared memory region.

19. The method of claim 17, wherein:
the software accelerator includes a driver for the storage device.

* * * * *